March 23, 1926.
B. W. WESTBO
1,577,855
AIR BRAKE LOCK
Filed March 9, 1925
2 Sheets-Sheet 1
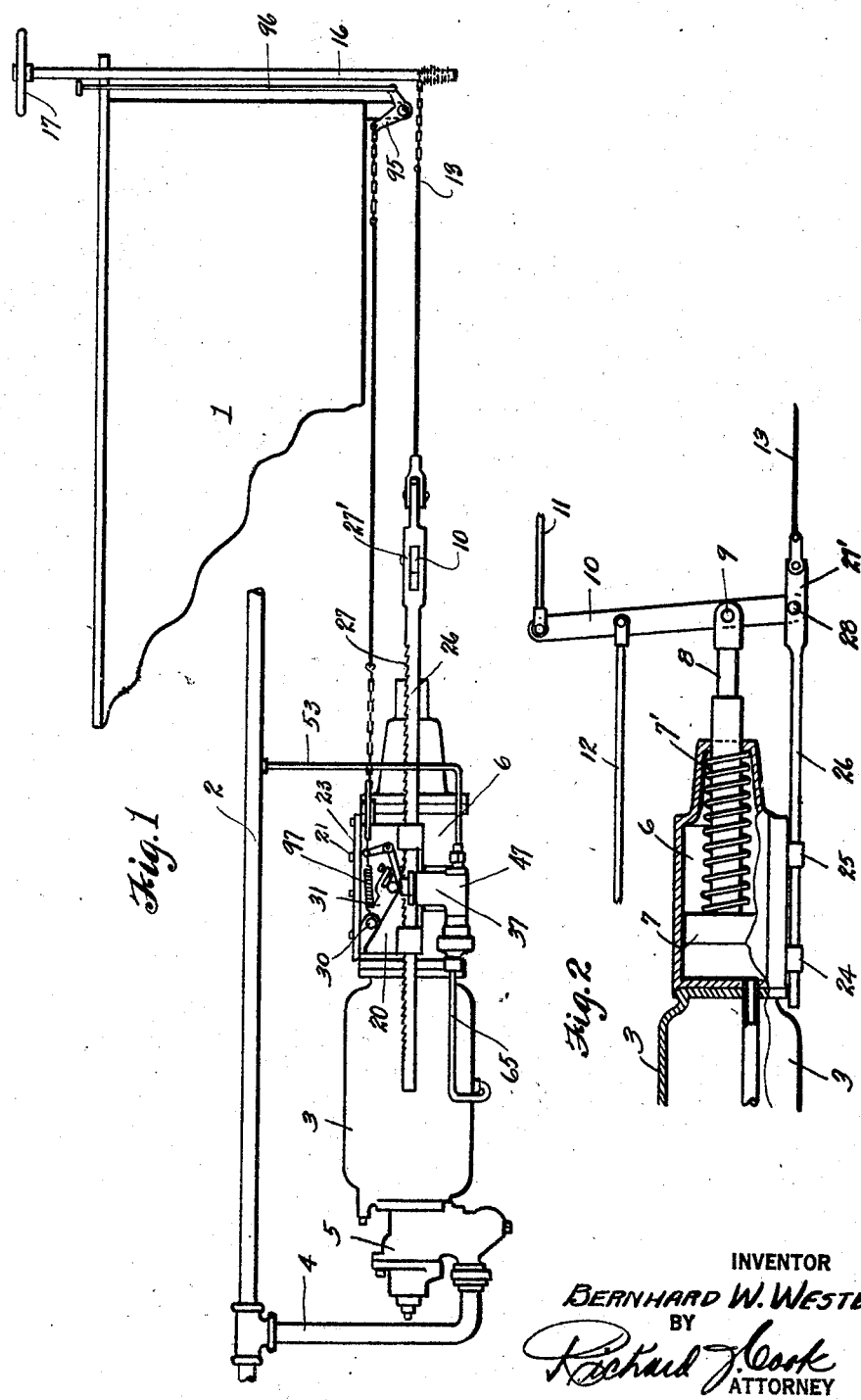
INVENTOR
BERNHARD W. WESTBO
BY
Richard J. Cook
ATTORNEY March 23, 1926.  
B. W. WESTBO  
AIR BRAKE LOCK  
Filed March 9, 1925
1,577,855
2 Sheets-Sheet 2
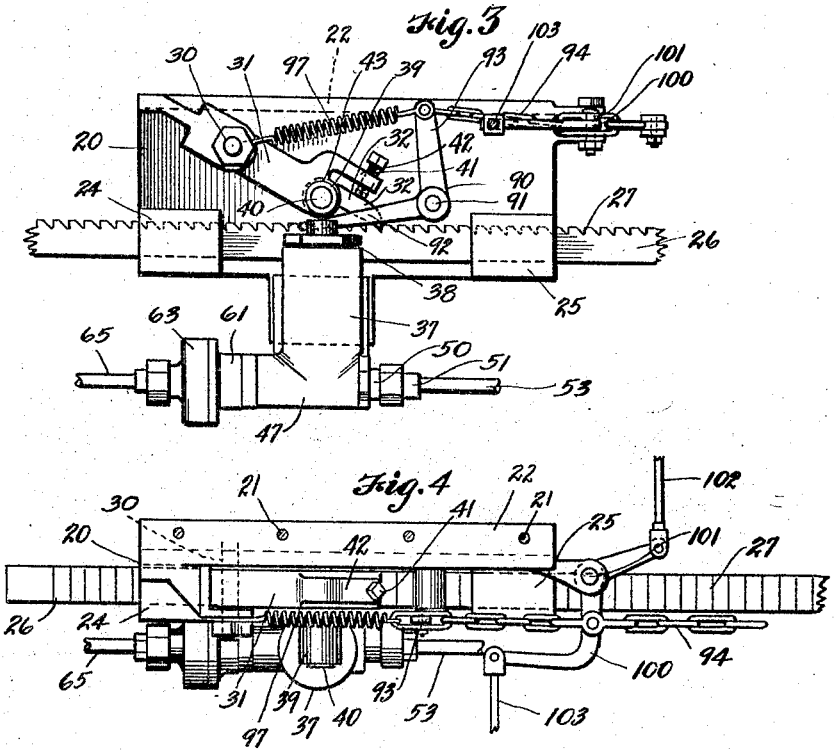
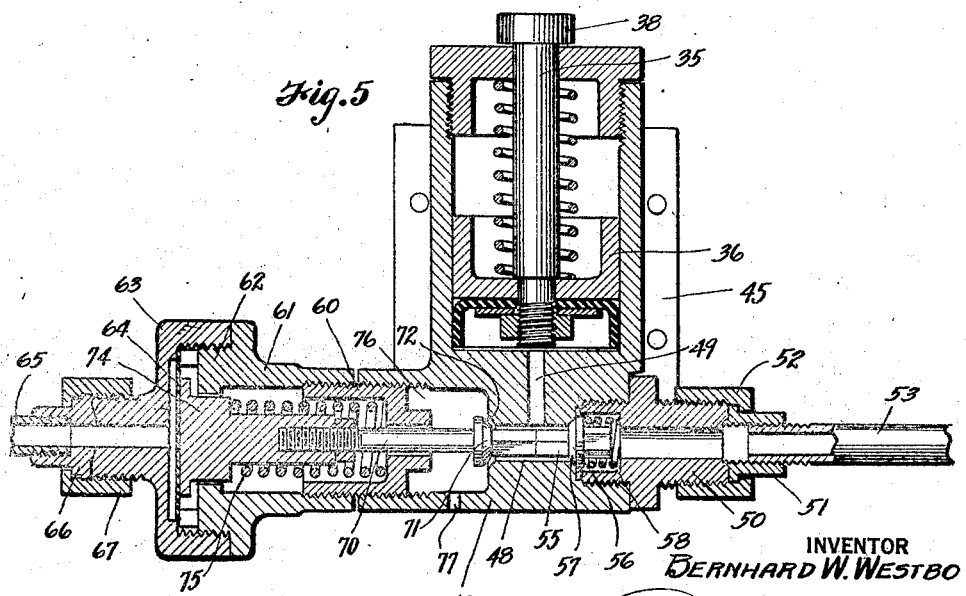
INVENTOR  
BERNHARD W. WESTBO  
BY  
Richard H. Cook  
ATTORNEY Patented Mar. 23, 1926.

1,577,855

UNITED STATES PATENT OFFICE.

BERNHARD W. WESTBO, OF SOUTH PRAIRIE, WASHINGTON, ASSIGNOR TO RAILWAY SAFETY BRAKE LOCK CORPORATION, OF TACOMA, WASHINGTON.

AIR-BRAKE LOCK.

Application filed March 9, 1925. Serial No. 14,090.

*To all whom it may concern:*

Be it known that I, BERNHARD W. WESTBO, a citizen of the United States, and a resident of South Prairie, Pierce County, Washington, have invented certain new and useful Improvements in Air-Brake Locks, of which the following is a specification.

This invention relates to improvements in air brake mechanism and more particularly to an air brake locking mechanism that operates automatically to prevent the release of a brake incidental to a reduction of pressure in the brake cylinder due to leakage, exhaustion of supply or accident to pipe connections.

The principal object of this invention is to simplify the construction of the mechanism illustrated and described in the application for patent on air brake lock filed September 10, 1924, under Serial No. 736,854.

To better explain the purpose of the invention, I will state that the present locking mechanism is intended for use in connection with the air brake as now used on railway rolling stock and which is a combination of parts controlled and operated by compressed air. More specifically stated, such mechanism consists of a source of compressed air supply, a brake valve by means of which an engineer can supply or release the brakes, a brake pipe, or train line, by means of which connection is made between the brake valve and brake apparatus of each car in a train, a brake cylinder by means of which the power stored in compressed air may be transformed into mechanical force to a brake gear consisting of various rods, brake shoes and other required connections whereby the brake shoes may be applied to the wheels of a car to retard it.

In connection with the above parts there is also included for each separate vehicle, an auxiliary reservoir in which a supply of compressed air is stored sufficient to operate the brake on that vehicle, a tripple valve to which the brake pipe, auxiliary reservoir and brake cylinder are connected and which serves to control the flow of air from the brake pipe to the auxiliary reservoir when charging, from the auxiliary reservoir to the brake cylinder when applying and from the brake cylinder to atmosphere when releasing the brake. When the brakes are not being used, the train pipe and auxiliary reservoir are charged and maintained at a fixed normal pressure. The brakes are applied by reducing the pressure in the train pipe below that in the auxiliary reservoir. Such a reduction is caused by an opening being made from the train pipe, or its connections, to atmosphere and may be intentional as when the engineer opens the brake valve or accidentally as in case of the breaking of a pipe or hose.

To those familiar with train operations, it is known that if a train of cars equipped with air brakes is disconnected from the engine which furnishes the source of air supply, the brakes of all cars will be applied for the reason that opening the train line destroys the equality of train line and auxiliary reservoir pressure causing the tripple valve of each car to operate to apply the brakes by admitting compressed air from the auxiliary reservoir to the brake cylinder. It is further known that for various reasons, after a brake has been set, the air will gradually leak from the brake cylinder and permit the brake to be released. Then, if the train happens to be standing on a grade it may start to roll unless the hand brakes, with which cars are usually equipped, have been set.

It is further known that the air supply of trains sometimes is used faster than it can be supplied. This is most apt to occur with heavy trains operating on long down grades, and when such does occur the hand brakes must be resorted to and depended upon entirely until the supply of air can again be built up.

In view of these undesirable results, due to air leakage or exhaustion of supply, it has been the object of this invention to provide automatically operating locking means for use in connection with brakes of the above character that will move into position for holding a brake when set should the pressure of air in the brake cylinders for any reason fall below a certain pre-determined amount and which will move to non-functional position when a safe working pressure has again been built up in the auxiliary reservoir.

Another object of the invention resides in the provision of locking devices, as above stated, that may be manually set or released and which may be installed on the regular brake equipment of railway cars without alteration in the construction or arrangement of such parts as they already exist.

Other objects of the invention reside in the various details of construction and combination of parts of the automatic locking device and in their mode of operatoin.

In accomplishing these and other objects of the invention, I have provided the improved details of construction, the preferred forms of which are illustrated in the accompanying drawings, wherein—

Figure 1 is a fragmental side elevation of a car equipped with air brake mechanism and a lock therefor in accordance with details of the present invention.

Figure 2 is a plan view, partly in section, of parts of the braking mechanism.

Figure 3 is an enlarged, side view of the locking mechanism.

Figure 4 is a plan of the same.

Figure 5 is an enlarged sectional view of the valve mechanism used in connection with the lock, and which controls the locking pawl.

Referring more in detail to the drawings—

1 designates what may be a railway car, equipped with air brake mechanism of that type in connection with which the present automatic locking device is used. The air brake mechanism is of the usual form now generally used on all railway cars and consists principally of the train pipe 2, through which compressed air is delivered from a source of supply, not shown, along the train to the individual brake mechanism of each car, and auxiliary reservor 3 that is connected so as to be charged from the train line through a pipe 4 and an interposed tripple valve mechanism, designated at 5, and a car brake cylinder 6 that receives its air from the auxiliary reservoir, under control of the tripple valve.

Within the brake cylinder 6 is a piston 7 adapted to be moved outwardly against the resistance of a coiled spring 7' by the admittance of air to the cylinder and fixed to the piston is a rod 8 which, at its outer end, connects pivotally as at 9, with a lever 10 to which in turn are connected rods or cables 11 and 12 extended to the brake beams or corresponding parts, not shown, at opposite ends of a car and which carry brake shoes that are adapted to be pressed into engagement with the car wheels when it is desired to retard or stop the car. The piston rod 8 connects with the lever 10 at a point approximately two-thirds of the distance between its ends and the rods 11 and 12 are pivotally attached to the lever, respectively, at the extreme end of the longer section and intermediate this end and the pivot connection with the piston rod, the parts operate so that when air is admitted from the auxiliary reservoir to cylinder 6 which drives piston 7 and rod 8 outwardly, the lever 10 is so moved as to cause braking tension on both rods 11 and 12.

The locking mechanism embodied by the present invention is mounted upon a base plate 20 which is vertically disposed against the side of brake cylinder 6 and is fixed thereto by means of bolts 21 extended through a laterally turned flange 22 along the top edge of the plate and a supporting flange 23 formed integral with the cylinder 6. These bolts may also serve to support the brake cylinder from the car structure.

Cast integral with the plate 20 at its opposite side edges are guides 24 and 25 through which a lock bar 26 is slidably extended. Along its upper edge the bar is provided with ratchet teeth 27 and near one end it has a loop 27' into which one end of the brake lever 10 extends and wherein it is fixed by a pivot pin 28. The connection and mounting of the parts is so arranged that the lock bar slides back and forth in its mountings in accordance with the movement of the lever 10 as influenced by the hand or air brake.

To the outer end of the lock bar 26 a cable 13 is attached which extends to the hand brake shaft 16 at the end of the car. This cable may be wound on the shaft by rotation of the brake wheel 17 at its upper end if it is desired to set the brake by hand.

Pivotally fixed to the base plate 20 by means of a bolt 30 is a locking dog 31 having a pivotally mounted pawl 32 at its end adapted to holdingly engage with the teeth 27 of the locking bar. Normally, that is when there is sufficient air pressure in the auxiliary reservoir 3 to hold the brakes set, the locking means is not needed and the pawl is held disengaged from the teeth of the locking bar by means presently described, but as soon as this pressure approaches the point at which it will become insufficient to hold the brake, the pawl is permitted to move into holding engagement with the teeth of the lock bar so that the latter cannot move inwardly and the brake beam will be held thereby so that the brakes cannot be released.

The means just referred to for controlling movement of the locking dog, as best shown in Figures 4 and 5, consists of a plunger 35 connected at it lower end with a piston 36 operable in an air cylinder 37 under the control of air in the auxiliary reservoir. At the upper end of the plunger is a head 38 adapted, when the plunger is extended, to engage with a roller 39 supported by a pin 40 from the dog to thereby lift the dog and locking pawl from the rack teeth. When the plunger retracts, the dog is free to drop to permit the pawl to lock with the rack bar.

An important feature of the invention resides in the construction and manner of mounting the pawl on the locking dog which permits it to be easily released regardless of the amount of holding pressure against it. The pawl is pivotally mounted on the pin 40 that mounts the roller 39. Its upward pivotal movement is limited by contact with an adjusting screw 41 that is threaded through an extension 42 from the end of the dog overlying the pawl. A coiled spring 43 located about the pin 40 bears against the pawl to retain it yieldingly in place but when pressure is exerted by the plunger upwardly against the roller the locking device will hinge upwardly at the pivot point 40 and thus the lock bar will be released. As soon as the pawl is disengaged from the rack, the spring 43 brings it back to normal position. Without this feature of construction, an excessive amount of pressure would be required to release the pawl if there is any tension on the brake beam.

The air cylinder 37 has a supporting flange 45 through which bolts 46 are extended to fix it to the plate 20 and formed integral with the lower end of cylinder 37 is a horizontally directed valve housing 47 having a central passage 48 communicating with each end of the housing and which is connected with the lower end of cylinder 37 by means of a channel 49.

Connected with one end of the housing 47 through the intermediacy of nipples 50 and 51 and union 52, is a pipe 53 that connects with the train line pipe 2. This pipe has communication with the cylinder 37 through channels 48 and 49. A valve member is located in the inner portion of nipple 50 and channel 48 comprising a stem portion 55 and integral collar 56; the latter being adapted to a tapered seat 57 about the outer end of channel 48 to close the latter against air from the train line. A spring 58 coiled about the outer part of stem 55 and bearing against nipple 50 yieldingly retains the valve closed.

Threaded part way into the other end of the valve housing 47 is a sleeve 60 and onto the outer portion of this is threaded a fitting 61 provided with a flange 62 at its outer end onto which a cap 63 is threaded. A flexible diaphragm 64 is clamped between the end of fitting 61 and the cap and a pipe 65, leading from the auxiliary reservoir 3, connects with the cap through the intermediacy of nipple 66 and union 67.

Located within the channel 48 is a valve mechanism comprising a valve stem 70 and an integral collar 71 adapted to a tapered seat 72 at the end of the channel. The inner end of this stem engages with the inner end of stem 55 and these are of such length that when valve 56 is closed, the valve 71 will be opened, and vice versa. The outer end of valve stem 70 is threaded into a head portion 74 which seats against the inner face of diaphragm 64 and is yieldably held against inward movement by means of a coiled spring 75 that bears against the inner face of head 74 and inner end portion of sleeve 60. This spring normally retains the valve 71 open so that there is free passage of air from cylinder 37 through channel 49 and channel 48 into the chamber 76 just within the inner end of sleeve 60 and this chamber has an opening 77 to atmosphere through its lower side wall as shown in Figure 5.

With the device so constructed it will operate as follows: When the auxiliary reservoir is charged to a suitable working pressure, this pressure will be communicated through pipe 65 against the outer face of diaphragm 64 causing the latter to move inwardly against pressure of spring 75 to seat valve 71 and to open valve 56 so that there is a direct communication between the train pipe and cylinder 37 through pipe 53 and channels 48 and 49. The air pressure from the train line acts against the piston 36 and moves it upwardly causing head 38 to engage the roller 39 on dog 31 and to lift and hold the pawl 32 free of ratchet bar 26. Thus, so long as there is a desired working pressure in the train line and auxiliary reservoir the brake mechanism operates the same as if the present device were not used.

Assuming then that the brake of a car has been set by air and that for some reason such as a leakage or exhaustion of supply, the pressure of air in the auxiliary reservoir approaches a point at which it would be insufficient to hold the brakes set, the spring 75 overcomes the pressure against the diaphragm 64 and pushes the head 74 outwardly thereby opening valve 71 and permitting valve 56 to close. As soon as valve 71 is opened the air from cylinder 37 escapes to atmosphere through channel 49, channel 48, chamber 76 and port 77. The spring contained within cylinder 37 and bearing downwardly on the piston moves the plunger 35 downwardly thereby releasing the dog 31 so that pawl 32 will drop into locking contact with teeth of bar 26 to prevent the release of the brake. When the auxiliary reservoir is recharged to a safe or desirable pressure the diaphragm 64 will be pushed inwardly, overcoming spring 75 thereby seating valve 71 and opening valve 56 so that air from the train line will again act on piston 36 to release the pawl from the locking bar 26.

For the purpose of manually releasing the dog from the lock bar by a person on top of the car, I have provided a bell crank lever 90 that is pivotally fixed by a bolt 91 to plate 20. This crank has an arm 92 extended beneath the roller 39 on the dog 31 and another arm 93 extending upwardly to which a chain 94 is attached. This chain connects with one arm of a bell crank 95 pivotally mounted at the end of the car. A rod 96 is fixed to this latter crank and extends upwardly through suitable guides to a point adjacent the hand brake wheel. By pressing downwardly on this rod the crank arm 92 will be thrown upwardly against roller 39 to disengage the pawl 32 from the teeth of the rack or lock bar. Spring 97 connected with bolt 30 and arm 93 retains it to normal position.

To permit the manual release of the lock by a person at either side of the car, I have provided an S shaped release lever 100 that is pivotally supported in horizontal position by bolt 101 from plate 20. Rods 102 and 103 are attached to its opposite ends and these are extended to opposite sides of the car. One arm of this lever is fixed to chain 94 in such manner that pull on either rod 101 or 102 will rock the lever and through chain 94 will actuate bell crank 90 to lift the dog and pawl from the lock bar 26.

When the car is entirely disconnected from a source of compressed air, the brakes may be operated by the hand brake in the usual manner and will be locked when set by the present locking device.

It will be noted that the tension of spring 75 may be varied by adjustment of sleeve 60 so that the locking device will be released or set at any desired pressure in the auxiliary reservoir.

Having thus described my invention, what I claim as new therein and desire to secure by Letters-Patent, is:

1. The combination with an air brake mechanism including a train pipe, an auxiliary air reservoir, braking mechanism and a brake locking device of an air cylinder, a piston operable in the cylinder to move the locking device between functional and non-functional positions, a valve housing having air connection with the cylinder, the train line and auxiliary reservoir and having an air exhaust port therein, valves and control mechanism therefor in said housing operable under the influence of pressure of air in the auxiliary reservoir to move the valves to admit air into the cylinder from the train line to actuate the piston to retain the locking device in non-functional position so long as the pressure of air in the auxiliary reservoir remains above a predetermined amount and to release the air from the cylinder and close off the train line connection when the pressure falls below said predetermined amount to thereby permit retraction of the piston and movement of the locking device into functional position to retain the brakes set.

2. The combination with an air brake mechanism of the character described including a train pipe, an auxiliary reservoir braking mechanism and a brake locking device of an air cylinder, a piston operable outwardly in the cylinder to move the locking device from functional to non-functional position, a valve housing, a flexible diaphragm disposed within the housing, a conduit connecting the housing at one side of the diaphragm with the auxiliary reservoir whereby the diaphragm sustains the pressure of air in the latter, a conduit connecting the housing at the other side of the diaphragm with the train line; said housing having an air exhaust port and having channels connecting the air cylinder with the conduit to the train line and with said exhaust port, valve members for controlling the passage of air through said channels from the train line to the cylinder and from the cylinder to the exhaust port, yieldable means for retaining the valve between the train line and cylinder closed and for sustaining the diaphragm against deflection as long as pressure in the auxiliary reservoir is below a certain amount and a valve stem operable by deflection of the diaphragm to adjust the valve mechanism to close the exhaust and to admit air from the train line to the air cylinder to actuate the piston outwardly.

3. The combination with an air brake mechanism of the character described including a train pipe, an auxiliary reservoir braking mechanism and a brake locking device of an air cylinder, a piston operable outwardly in the cylinder to move the locking device from functional to non-functional position, a valve housing, a flexible diaphragm disposed within the housing, a conduit connecting the housing at one side of the diaphragm with the auxiliary reservoir whereby the diaphragm sustains the pressure of air in the latter, a conduit connecting the housing at the other side of the diaphragm with the train line; said housing having an air exhaust port and having channels connecting the air cylinder with the conduit to the train line and with said exhaust port, valve members for controlling the passage of air through said channels from the train line to the cylinder and from the cylinder to atmosphere, a spring yieldably retaining the valve between the train line conduit and cylinder in closed position and the valve between the cylinder and exhaust port open, a spring for sustaining the diaphragm against reflection before a predetermined air pressure has been reached in the auxiliary reservoir and a valve stem engaging with the diaphragm and adapted to be moved by deflection of the latter to shift the valves to close the exhaust and open the channel between train line conduit and cylinder to actuate the piston outwardly, and means for adjusting the sustaining pressure of said spring against the diaphragm.

4. The combination with an air brake mechanism of the character described comprising an auxiliary reservoir, a train pipe, braking mechanism and a brake locking device, of an air cylinder, a piston in said cylinder operable to control the locking device, a valve housing, a conduit connecting one end of the housing with the train line, a sleeve threaded part way into the other end of the housing, a fitting threaded onto the outer portion of the sleeve, a cap applied to the fitting, a flexible diaphragm clamped between the fitting and cap, a conduit connecting the auxiliary reservoir and cap whereby the diaphragm sustains the pressure of the latter and is caused to expand and contract in accordance with variation of pressure in the auxiliary reservoir; said valve housing having an exhaust port and an air channel between the said port and the connection with the train line conduit provided with spaced, valve seats facing outwardly from each other and a connecting channel leading therefrom from between said seats into the air cylinder, valve members adapted to said seats and having engaging stems whereby the seating of either valve unseats the other, a spring for urging the train line valve to closed position and the exhaust valve to open position, and a valve actuating stem having a head portion seated against said diaphragm whereby inward deflection of the diaphragm reverses the position of the valves so as to admit air to actuate the piston outwardly and a spring bearing against said seat and fitting to resist deflection of the diaphragm and variable in its tension by adjustment of the sleeve into or from the housing.

Signed at Tacoma, Pierce County, Washington, this 5th day of December, 1924.

BERNHARD W. WESTBO.